Nov. 27, 1951 — D. B. CARTER — 2,576,212
FISHING ROD HOLDER
Filed June 16, 1947 — 2 SHEETS—SHEET 1

Inventor.
Daniel B. Carter

Nov. 27, 1951     D. B. CARTER     2,576,212
FISHING ROD HOLDER
Filed June 16, 1947     2 SHEETS—SHEET 2
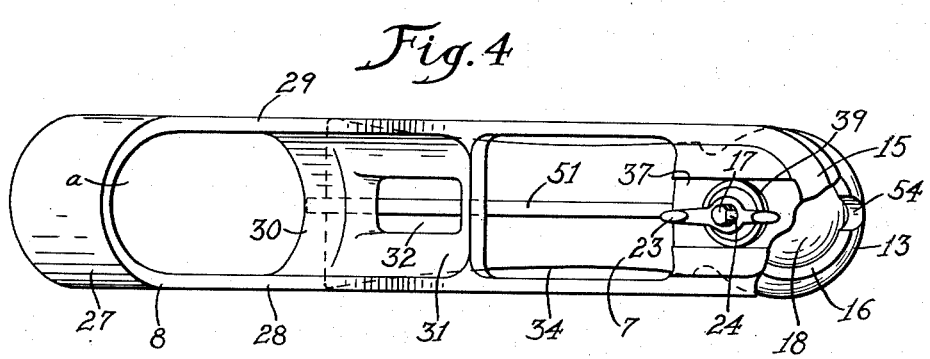
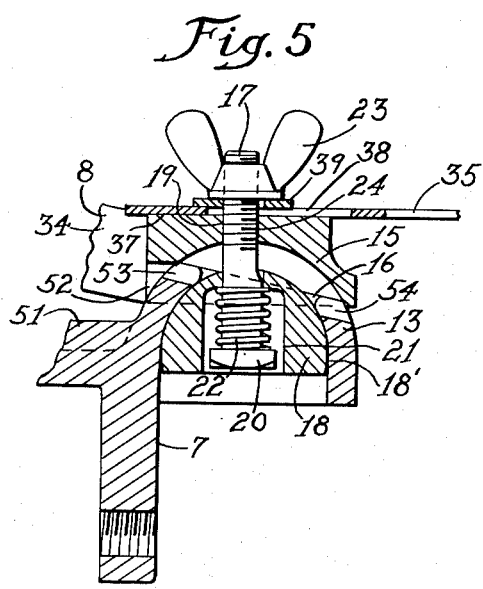
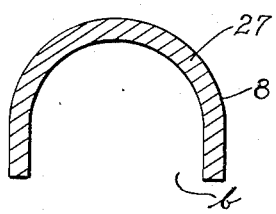
Inventor:
Daniel B. Carter Patented Nov. 27, 1951

2,576,212

UNITED STATES PATENT OFFICE 2,576,212

FISHING ROD HOLDER

Daniel B. Carter, Rockford, Ill.

Application June 16, 1947, Serial No. 754,839

9 Claims. (Cl. 248—42)

1

This invention relates to a new and improved fishing rod and pole holder.

The principal object of my invention is to provide a fishing rod and pole holder that is of simple and economical construction and is substantially universally adjustable to permit application either to the side of a boat or to a seat therein and permit extending the rod or pole in any direction desired and at whatever inclination is preferred, the holder being furthermore so designed that it is foldable to a reasonably compact size for easy storage and easy packaging for shipment but can be unfolded quickly and easily when it is to be set up for use.

A salient feature of the holder of my invention is the provision of a universal joint type support for the rod holder relative to its attaching bracket, which is adapted to be fastened rigidly in adjusted position by the tightening of a single clamping bolt, there being a hollow semi-spherical ball-head preferably cast integral with the attaching bracket arranged to fit in a semi-spherical socket provided therefor in the rod holder, the ball-head having an enlarged central opening through which the single clamping bolt extends from a semi-spherical-shaped block working in a semi-spherical socket in the ball-head through a hole in the end of the rod holder for universal adjustability of the rod holder through a considerable angularity, the rod holder being easily clamped in any position of adjustment by the tightening of a wing nut threaded on the projecting end of the bolt. A coiled compression spring is preferably provided surrounding the headed end of the bolt in a recess in the semi-spherical-shaped block which is compressed in the tightening of the wing nut, so that the rod holder is clamped resiliently in its adjusted position and there is less likelihood therefor of the nut loosening once it has been properly tightened.

Another important feature of the fishing rod holder of my invention is the provision of an auxiliary supporting bracket adjustably mounted on the rod holder and providing an upwardly reaching arm that is also adjustable in height and has a crotch provided in its upper end to receive the rod for auxiliary support, a snap-clasp being preferably provided on the upper end of said arm extending over the crotch for quickly releasably locking the rod therein against accidental displacement.

The invention is illustrated in the accompanying drawings, in which

Fig. 4 is a plan view of the device in its folded condition;

Fig. 5 is a vertical section through the universal joint connection between the attaching bracket and the rod holder, and Fig. 6 is a sectional detail on the line 6—6 of Fig. 1.

The same reference numerals are applied to corresponding parts throughout the views.

Figure 1:
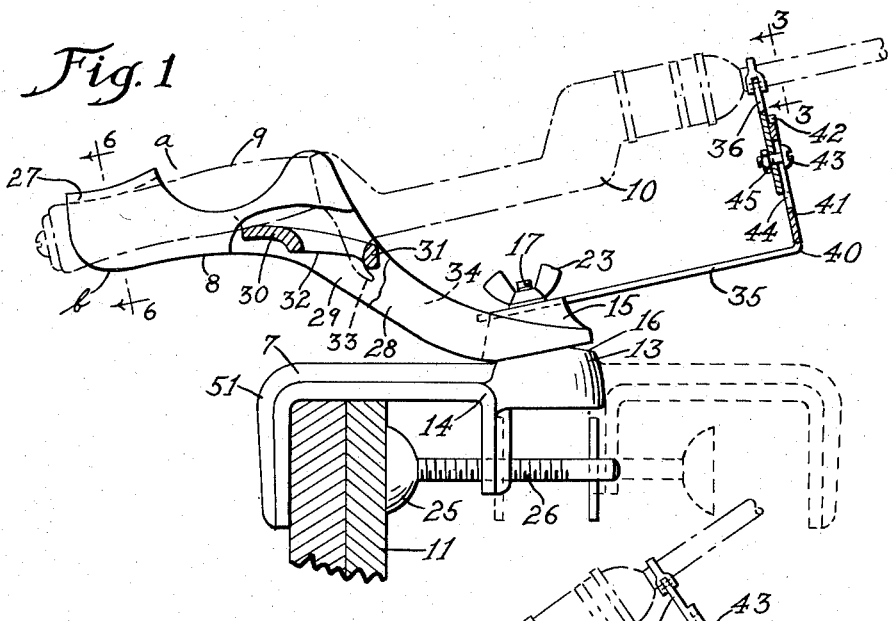
Fig. 1 is a side view of a fishing rod holder made in accordance with my invention, the same having its attaching bracket shown applied to the side of a boat in two positions, one in full lines and the other in dotted lines to indicate the universal adjustability.
Figure 2:
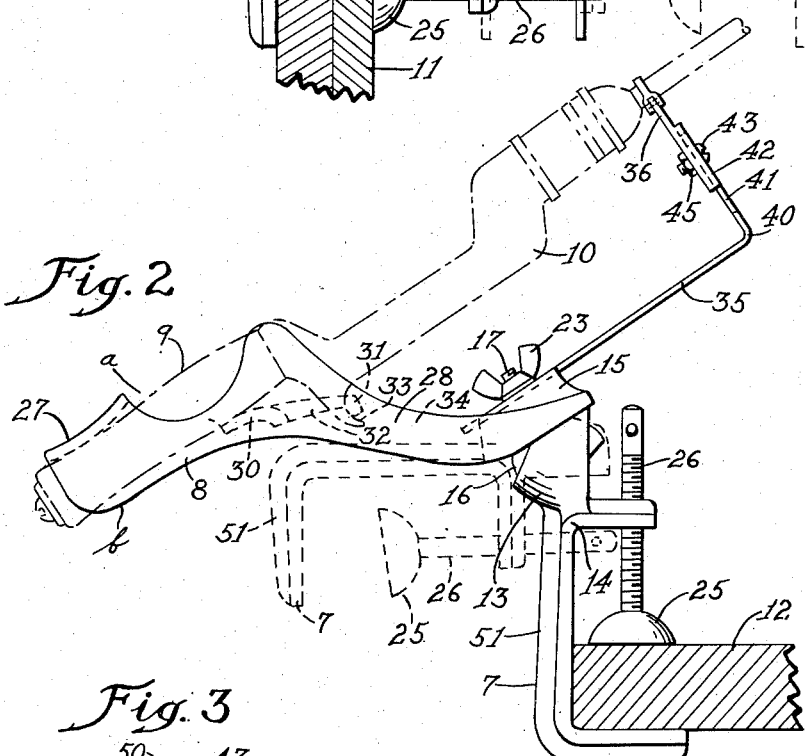
Fig. 2 is another side view of the device shown applied to the seat of a boat, the attaching bracket being also indicated in a folded position in dotted lines to indicate the compactness of the device as a whole when folded.
Figure 3:
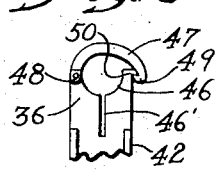
Fig. 3 is a face view of the snap-clasp taken on the line 3—3 of Fig. 1.

Referring to the drawing, the reference numeral 7 designates a C-clamp constituting the attaching or fixed supporting bracket, and 8 the rod or pole carrying holder or support, which is especially designed to accommodate the handle or butt end 9 of a conventional offset handle type fishing rod indicated at 10 in Figs. 1 and 2, although the device is suitable also for use with any ordinary straight fishing poles. Both the bracket 7 and holder 8 are castings for economy, aluminum being preferably used for lightness and also freedom from rusting. As will soon appear, these parts may be cast substantially to the final form desired, whereby to reduce machining costs to a minimum and accordingly keep the final cost of the device as low as possible. In Fig. 1, the attaching bracket 7 is shown applied to the side 11 of a boat, and in Fig. 2 it is shown applied to a boat seat 12. A hollow semi-spherical ball-head 13 is preferably cast integral with the attaching bracket 7 on one corner portion or shoulder 14 thereof and is arranged to fit in a semi-spherical socket 15 provided in the front end of the rod holder 8. The wall of the ball-head 13 is cored out or cut away on top to provide an enlarged substantially central opening 16 through which a clamping bolt 17 extends freely from a semi-spherical shaped block 18 that is disposed in the concentric semi-spherical socket 18' provided in the ball-head, the bolt extending upwardly from hole 16 closely through a hole 19 provided in the front end of the rod holder 8 opening centrally into the socket 14, whereby to provide for universal adjustability of the rod holder 8 through a large angularity limited ultimately only by the size of the opening 16. The bolt 17 has a head 20 on its lower end disposed in a recess 21 provided in the center of the bottom of the block 18, and a coiled compression spring 22 surrounds the headed end of the bolt in the recess and is arranged to be compressed in the tightening of the wing-nut 23 that is threaded on the upper end of the bolt, so that the rod holder 8 is clamped resiliently in its adjusted position and there is less likelihood therefore of the nut working loose once it has been properly tightened. The threaded end of the bolt 17 is milled off flat on one side lengthwise, as indicated at 24, and the hole 19 is correspondingly shaped so that the bolt will be held against turning relative to the rod holder 8, thereby facilitating the tightening and loosening of the wing-nut 23. The ball-head 13 fitting in the socket 15 enables truly universal adjustment of the rod holder 8, and the fisherman need only loosen and tighten the one wing-nut 23 in making an adjustment, such adjustments taking only an instant and requiring no mechanical skill. It is obvious from an inspection of Figs. 1 and 2 that the location of the ball-head 13 on the corner 14 of the attaching bracket 7 makes for a much wider range of adjustability of the rod holder 8 relative to bracket 7 and really makes it practical to fasten the bracket 7 either to a vertical member, like the side wall 11 of the boat, as in Fig. 1, or to any horizontal member, like the seat 12, as in Fig. 2. It is obvious that the arrangement of the ball-head and socket on the parts 7 and 8 may be reversed, if desired, the ball-head 13 being provided on the rod holder 8 and the socket 15 on the attaching bracket 7. The generally semi-spherical shaped block 25 provided as a swivel-block on the end of a screw 26 may be and preferably is like the block 18, whereby to make the castings for these parts interchangeable and accordingly reduce the overall cost of the device.

The rod holder 8 is of elongated, generally L-shaped, skeleton frame construction and has an inverted U-shaped saddle portion 27 on the outer end, remote from the socket 15, which straddles the handle grip portion 9 of the fishing rod 10. The rod holder 8 is open on top in front of the saddle 27, as indicated at a, and is open on the bottom, as indicated at b, so that the butt end of the handle 9 of a fishing rod may be inserted in the holder from above to fit under the saddle. The holder comprises opposed parallel side walls 28 and 29 integral with the opposite sides of the saddle portion 27, and these side walls are interconnected by a U-shaped web portion 30 in inwardly spaced relation to the saddle portion 27, this web portion being arranged for abutment with the bottom of the handle grip 9 when the fishing rod is placed in the holder. The U-shaped web portion 30 has a forward extension 31, in acute angle relationship to the web, in which a rectangular opening 32 is provided to accommodate freely the downwardly projecting hook-shaped finger grip portion 33 provided on the handle end of the fishing rod in front of the handle grip 9, thus permitting the fishing rod to be positively hooked onto the holder 8 to eliminate any danger of the rod being pulled out of the holder in the event of a sudden violent pull on the line as when a large fish strikes. The holder 8 is also cored out or cut-away as indicated at 34 between the web 30—31 and the socket 15 for lightness and economy of manufacture.

The device may or may not include an auxiliary supporting bracket 35, because I have found that the device works satisfactorily without this attachment. However, this bracket, especially when provided with the snap-clasp 36 for quickly releasably locking the fishing rod 10 therein against accidental displacement, enables the fisherman to row the boat or occupy his time otherwise without the slightest fear of the fishing rod being pulled out of the holder while his attention is distracted. The rod holder 8 has a longitudinally extending groove 37 provided therein on top of the socket 15 in which the rear end of the bracket 35 is slidably adjustable, there being an elongated slot 38 provided in this portion of the bracket 35 for extension therethrough of the bolt 17. A washer 39 is preferably provided on the bolt 17 under the wing-nut 23, as indicated in Fig. 5, it being clear that when the nut 23 is tightened it serves the double purpose of clamping the bracket 35 and holder 8 in adjusted position. The bracket 35 is of sheet metal strip construction and is bent upwardly, as indicated at 40, to provide an upwardly reaching arm 41 on the front end on which the clasp 36 is preferably vertically adjustable. The clasp has a channel-shaped attaching portion 42 slidably adjustable on the arm 41, and a bolt 43 extends through this portion 42 and through an elongated slot 44 in the arm 41 and receives a nut 45 which when tightened serves to clamp the attaching portion 42 of the clasp 36 in adjusted position. A crotch 46 is provided in the clasp 36 to accommodate the reduced portion of the rod 10 next to the handle and the clasp is split vertically, as indicated at 46', below the crotch to provide a certain amount of give in the crotch portion, so that the C-shaped clasp member 47 that is pivoted at 48 can be closed with a snap action, engaging its hooked end 49 under the projection 50, after which the rod can be removed only by manual compression of the clasp 36 accompanied with an upwardly pull on the fishing rod. In that way the fishing rod is very securely locked in place against accidental displacement. Obviously, longitudinal adjustability of the bracket 35 is afforded by the slot 38 and vertical adjustability of the clasp 36 is afforded by the vertical slot 44 in the arm 41, thus enabling adjustment of the auxiliary support to fit whatever make or style of fishing rod may be placed in the holder.

A reinforcing longitudinally extending rib 51 is provided on the attaching bracket 7 for stiffness and strength, and the rod holder 8 is notched out at 52 in one side of the socket 15 to accommodate the rib 51 when the holder is folded, as indicated by the dotted line position of bracket 7 in Fig. 2, as for packaging or for storage. The ball-head 13 is also preferably notched out on top on diametrically opposite sides, as indicated at 53 and 54 in Fig. 5, to accommodate the bolt 17 in opposite extremes of adjustment of rod holder 8 relative to bracket 7, while still providing adequate bearing surface in the ball-head 13 for the block 18. For example, in the full line positions of bracket 7 and rod holder 8 in Fig. 2, the bolt 17 enters notch 54, but in the dotted position of bracket 7 in Fig. 2, the bolt 17 enters notch 53, and it is apparent from a comparison of the full line and dotted line positions of bracket 7 in Fig. 2 that there is substantially 90° of adjustability of the parts 7 and 8 relative to one another, which is ample for the purposes intended.

In conclusion, it should be understood that the present device is not limited to use in or on a boat but may be applied to any convenient or improvised support on a pier or on the bank of a river or lake. Also, while it is designed primarily for a fisherman's use it is not limited to such use and may be used wherever a similar kind of support or holder is needed, as, for example, in holding a flag pole on or near a house or other building. The language employed in the accompanying claims should be construed accordingly.

It is believed the foregoing description conveys a good understanding of the objects and advantages of my invention. The appended claims have been drawn to cover all legitimate modifications and adaptations.

I claim:

1. In a device of the class described, in combination, a fixed supporting bracket, an adjustable rod carrying support, a ball and socket connection between said bracket and support for universal adjustability of said support including a screw member extending through the ball and socket and a nut threaded on said screw member serving to clamp the ball and socket connection in a selected adjustment holding the rod support in an adjusted angular relationship to said supporting bracket, and a rod securing member including a shank having a slot through which extends the screw member of the ball and socket connection for adjustment of said rod securing member relative to the first named rod carrying support and relative to said screw and nut, said shank being held by said nut in adjusted position when the screw and nut are tightened.

2. A device as defined in claim 1 in which the rod carrying support comprises an elongated member including engaging members at one end to grip the butt of a rod and a shank end offset downwardly from the rod engaging members having one of the elements of the ball and socket connection formed on the underside thereof and a longitudinally extending guide for the shank of the rod securing member formed on the upper side thereof.

3. In a device of the class described, in combination, a fixed supporting bracket, an adjustable rod carrying support, a pivotal connection between said bracket and support for adjustability of said support including a screw member extending through the connection and a nut threaded on the screw member serving to clamp the pivotal connection in a selected adjustment holding the rod support in an adjusted relationship to said supporting bracket, and a rod securing member including a shank having a slot through which extends said screw member for adjustment of said rod securing member relative to the first named rod carrying supporting and relative to said screw and nut, said shank being held by said nut and fastened in adjusted position when the screw and nut are tightened.

4. A fishing rod holder comprising a rod receiving and supporting element, and a C-clamp for clamping said holder to a support and including a C-shaped body having a clamping screw threaded in one transverse end portion of the C parallel to the longitudinal portion of the C, a hollow semi-spherical ball head rigid with and projecting outwardly from the junction of one end portion of the C and the longitudinal portion, said head having a concentric semi-spherical socket provided therein, said rod receiving and supporting element having a spheroidal-shaped socket provided therein wherein said ball head is universally slidably received, a spheroidal-shaped block having a universal sliding fit inside the ball head, and means extending radially from the block to connect it with the socket part, said ball head being truncated to define an enlarged circular opening in the wall of said head through which said connecting means extends and in which it has a wide range of universal angular movement.

5. A device as set forth in claim 4 wherein the semi-spherical ball head is on that end portion of the C-clamp carrying the clamping screw and has its flat side innermost and substantially parallel to and spaced from the clamping screw, the spacing being far enough to afford operating clearance for a T-shaped manually operable end portion provided on said screw.

6. A device as set forth in claim 4 wherein the semi-spherical ball head is on that end portion of the C-clamp carrying the clamping screw and has its flat side innermost and substantially parallel to and spaced from the clamping screw, the spacing being far enough to afford operating clearance for a T-shaped manually operable end portion provided on said screw, the plane of truncation of said semi-spherical ball head being inclined so that it is in inwardly diverging relationship relative to the longitudinal portion of the C-clamp.

7. A device as set forth in claim 4 wherein the semi-spherical ball head has its flat side innermost and substantially parallel to the longitudinal portion of the C-clamp, and wherein the plane of truncation of said semi-spherical ball head is inclined so that it is in inwardly diverging relationship relative to the longitudinal portion of the C-clamp.

8. A device as set forth in claim 4 wherein the connecting means comprises a bolt having a head on one end, the spheroidal block having a recess provided therein wherein said head is received whereby not to interfere with universal angular adjustability of the block in the socket in said ball head.

9. A device as set forth in claim 4 wherein the connecting means comprises a bolt having a head on one end and a coiled compression spring encircling said bolt in engagement with the head and arranged to be compressed in the tightening of the bolt whereby to clamp the parts resiliently in angularly adjusted relationship, the spheroidal block having a recess provided therein wherein said head together with the spring is received whereby not to interfere with universal angular adjustability of the block in the socket in said ball head.

DANIEL B. CARTER.

REFERENCES CITED

The following references are of record in the file of this patent:

UNITED STATES PATENTS

| Number | Name | Date |
|---|---|---|
| 1,268,096 | Crandall | June 4, 1918 |
| 1,278,318 | Edsall | Sept. 10, 1918 |
| 1,891,163 | Kabele | Dec. 13, 1932 |
| 2,143,109 | Hodaway | Jan. 10, 1939 |
| 2,249,302 | Smith | July 15, 1941 |

FOREIGN PATENTS

| Number | Country | Date |
|---|---|---|
| 836,692 | France | Jan. 24, 1939 |